United States Patent [19]

Takada, deceased et al.

[11] 3,907,059

[45] Sept. 23, 1975

[54] PASSIVE MOTION ARRESTING PROTECTIVE DEVICE OF SHOULDER ARM TYPE

[75] Inventors: Takezo Takada, deceased, late of Tokyo, Japan, by Juichiro Takada, legal representative, Tokyo, Japan

[73] Assignee: Takata Kojyo Co., Ltd., Tokyo, Japan

[22] Filed: Dec. 3, 1973

[21] Appl. No.: 421,376

[30] Foreign Application Priority Data
Dec. 5, 1972   Japan.............................. 47-121199

[52] U.S. Cl. ......................... 180/82 C; 280/150 SB
[51] Int. Cl.² ........................................ B60R 21/10
[58] Field of Search ............ 180/82 C; 280/150 SB; 297/385, 387, 388, 389

[56] References Cited
UNITED STATES PATENTS

| | | | |
|---|---|---|---|
| 3,343,623 | 9/1967 | Porter | 297/388 |
| 3,613,819 | 10/1971 | Maloney | 180/82 C |
| 3,637,259 | 1/1972 | Rothschild | 297/387 X |
| 3,712,401 | 1/1973 | Rothschild | 180/82 C |
| 3,717,216 | 2/1973 | Rothschild | 180/82 C |
| 3,743,046 | 7/1973 | Rothschild | 280/150 SB X |
| 3,781,061 | 12/1973 | Walz | 280/150 SB X |
| 3,807,523 | 4/1974 | Fiala | 180/82 C |

*Primary Examiner*—David Schonberg
*Assistant Examiner*—Terrance L. Siemens
*Attorney, Agent, or Firm*—Wolder & Gross

[57] ABSTRACT

A mechanism for applying a safety belt to a vehicle seat occupant in one form includes a pair of lap belts extending from retractor reels on opposite sides of the seats and shoulder belts extending from upper opposite portions of the seat back from retractor reels to the free ends of the lap belts which are provided with a buckle and tongue. A transfer arm is swingably mounted proximate upper corners of the seat back and includes a transversely extending upper section and a depending lower section terminating in slotted members slideably engaging the lap belts. When a seat is occupied and the vehicle doors closed, a motor is energized to advance the arms which extract the belts and couple the buckle and tongue in front of the occupant. In another form, the belt is of the three point type and one transfer arm advances the tongue and lap and shoulder belt junction to the other arm which conveys the tongue into engagement with a buckle attached to the other side of the seat.

10 Claims, 9 Drawing Figures

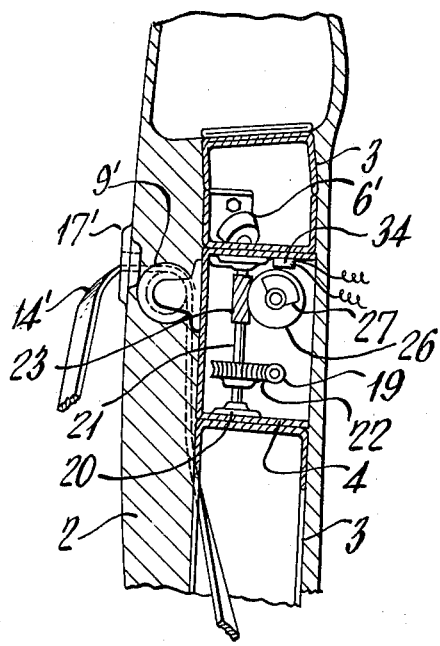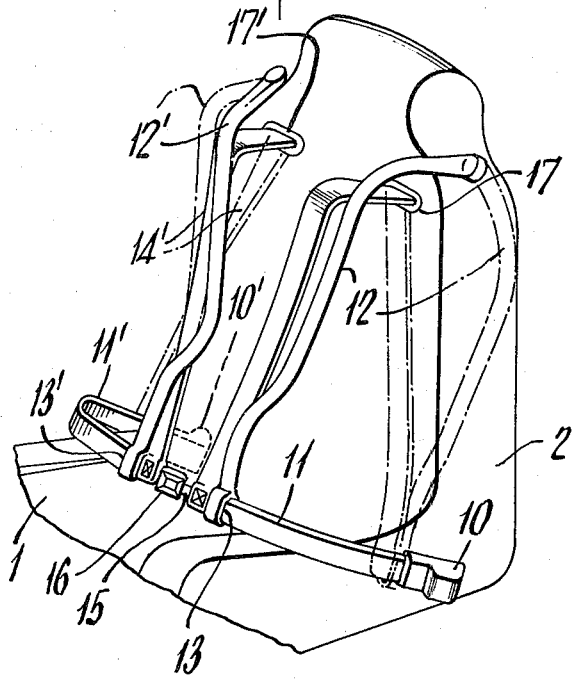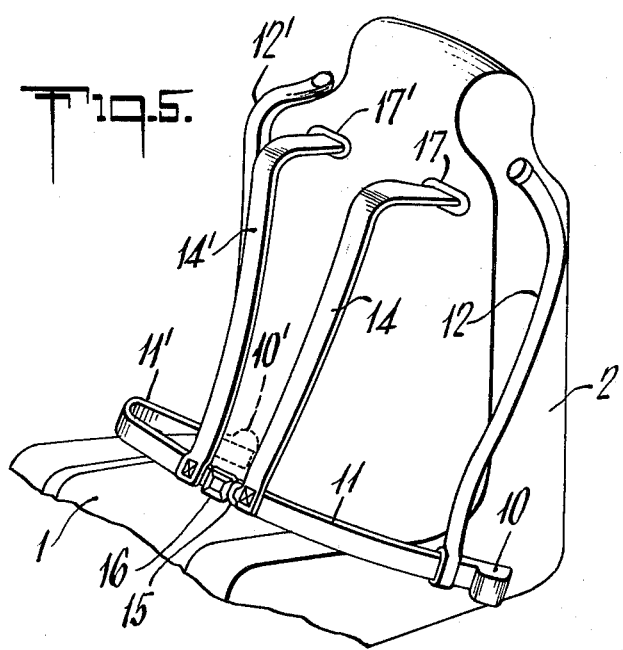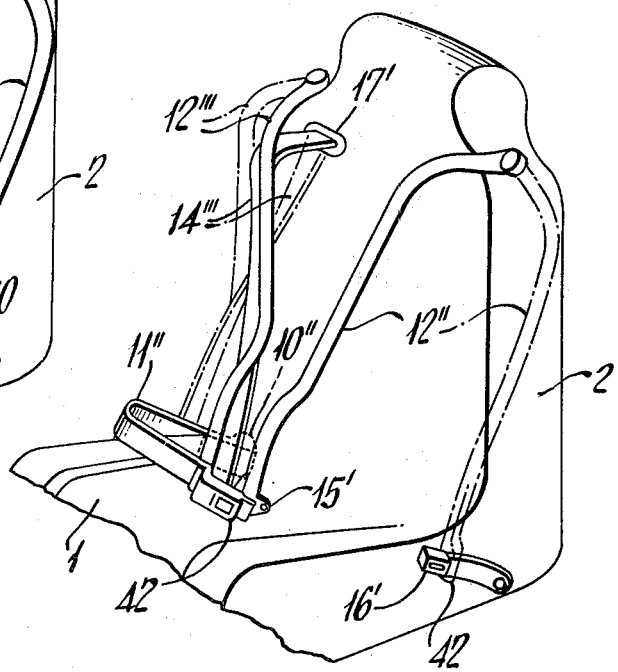

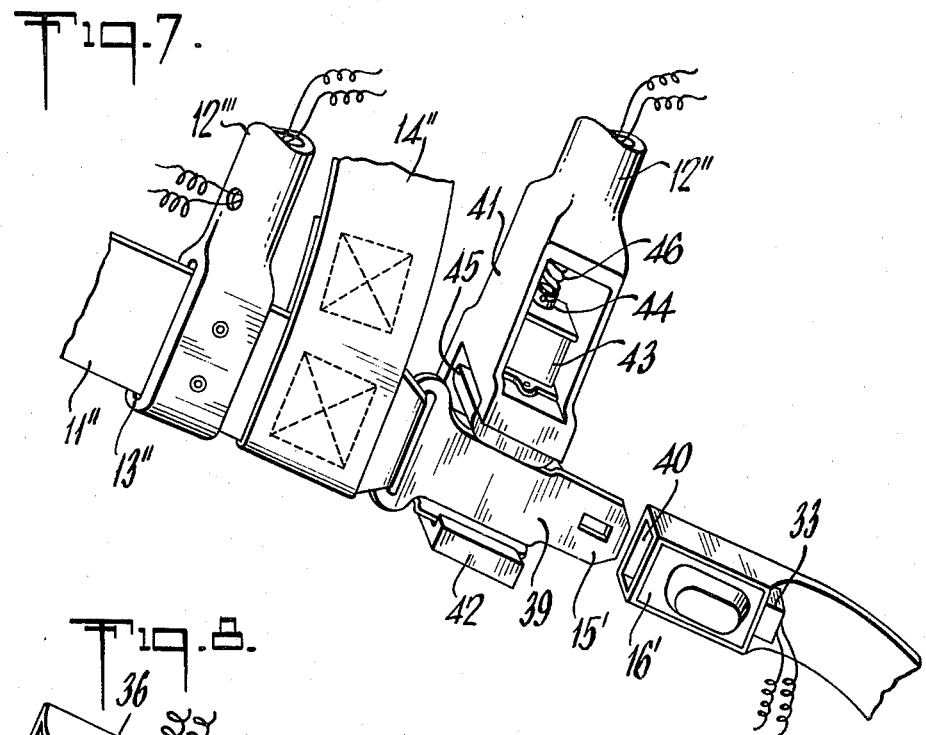
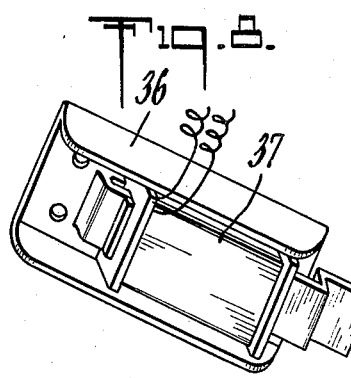
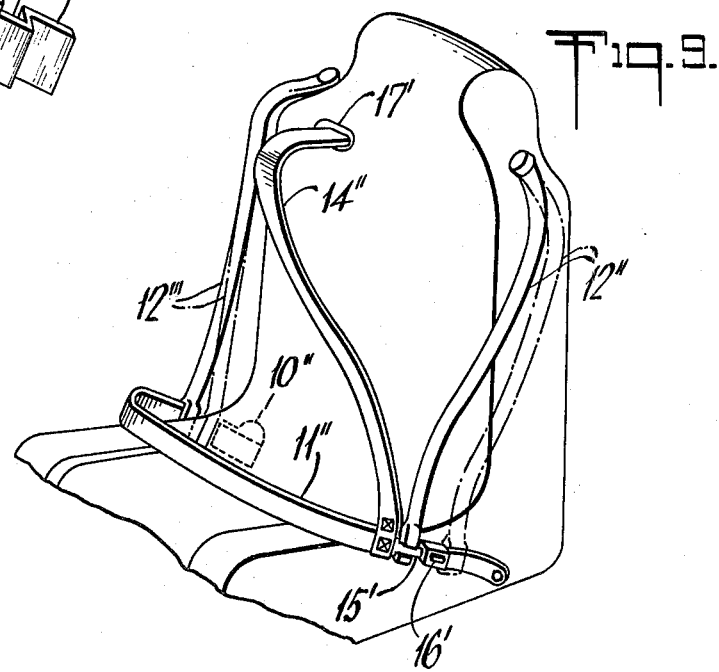

PASSIVE MOTION ARRESTING PROTECTIVE DEVICE OF SHOULDER ARM TYPE

BACKGROUND AND SUMMARY OF THE INVENTION

The present invention relates to a vehicle seat occupant restraint applying mechanism of the type which functions that when a vehicle driver or passenger takes his seat and shuts the vehicle door, a control network activates transfer arms to automatically advance the lap belts together with the shoulder belts, having ends thereof sewn to respective lap belts so that the seat occupant is equipped with the safety belt. Conventional seat occupant restraint devices of the semi-circumferential arm type possess the disadvantage that a movable semi-circular portion in the front of the seat back is required for restraining the seat occupant and another semi-circular portion in the rear of the seat back is required for receiving the arms to form a full circle, that is, there is required in the rear of the seat back an area useless in the functioning of the safety belt as such. The present invention is characterized in that the safety belt applying system is constructed to occupy the area of only a semi-circular portion extending from both sides of the seat towards the front of the seat occupant and the lower portion of two swingable transfer arms extend from the sloping flanks of the shoulder portion of the seat back. The present invention may be divided broadly into two groups, embodiments of which will be hereinafter described, the first group being of the four piece type which comprises two lap belts having one end thereof wound onto respective retractor reels fastened to opposite sides of the seat frames and the like, and the other ends thereof provided respectively with either a buckle body or a tongue, two shoulder belts having one end thereof wound onto respective retractor reels fixed to the rear seat frame, and the other ends thereof extend from the front of the shoulder portion of the seat back and sewn to the respective lap or waist belts, and two transfer arms provided with a slot at the lower end thereof, slideably engaging respective lap belts whereby the buckle body and the tongue are engaged with each other at the center in front of the driver consequent to the advance of the transfer arms. The other group includes a restraint applying device used with a safety belt of a three piece type which comprises a lap belt having one end thereof wound onto a retractor reel fastened to one side of the seat frame and the other end thereof provided with a coupling tongue or the like, a buckle body fixed to the other side of the seat frame, a shoulder belt having one end wound onto a retractor reel fixed to the rear seat frame and the other end thereof extending forwardly from the front of the shoulder portion of the seat back and sewn to the lap belt, one transfer arm having the lower end thereof provided with an electromagnet for precisely engaging and directing the tongue sewn to the lap belt towards the buckle body, and the other transfer arm having provided at the lower end thereof a solenoid mechanism for grasping a channel-shaped portion of the tongue at the front center of the seat occupant, whereby the tongue is transferred to the other arm and conveyed thereby into engagement with the fixed buckle body.

BRIEF DESCRIPTION OF THE DRAWINGS

FIG. 3 is a sectional view taken along line X—X in FIG. 2;

FIG. 4 is a front perspective view of the system showing the transfer arms in advanced positions;

FIG. 5 is a view similar to FIG. 4 showing the transfer arms in retracted positions and the safety belt applied;

FIG. 6 is a front perspective view of another embodiment of the present invention with the transfer arms shown in their advanced positions;

FIG. 7 is an enlarged detailed fragmentary front perspective view of the transfer members in their advanced tongue transfer positions;

FIG. 8 is a front perspective view of a magnetic tongue engaging and guide check mounted on a transfer arm; and FIG. 9 is a view similar to FIG. 6 showing the safety belt applied and the transfer arms retracted.

DESCRIPTION OF THE PREFERRED EMBODIMENTS

Figure 1:
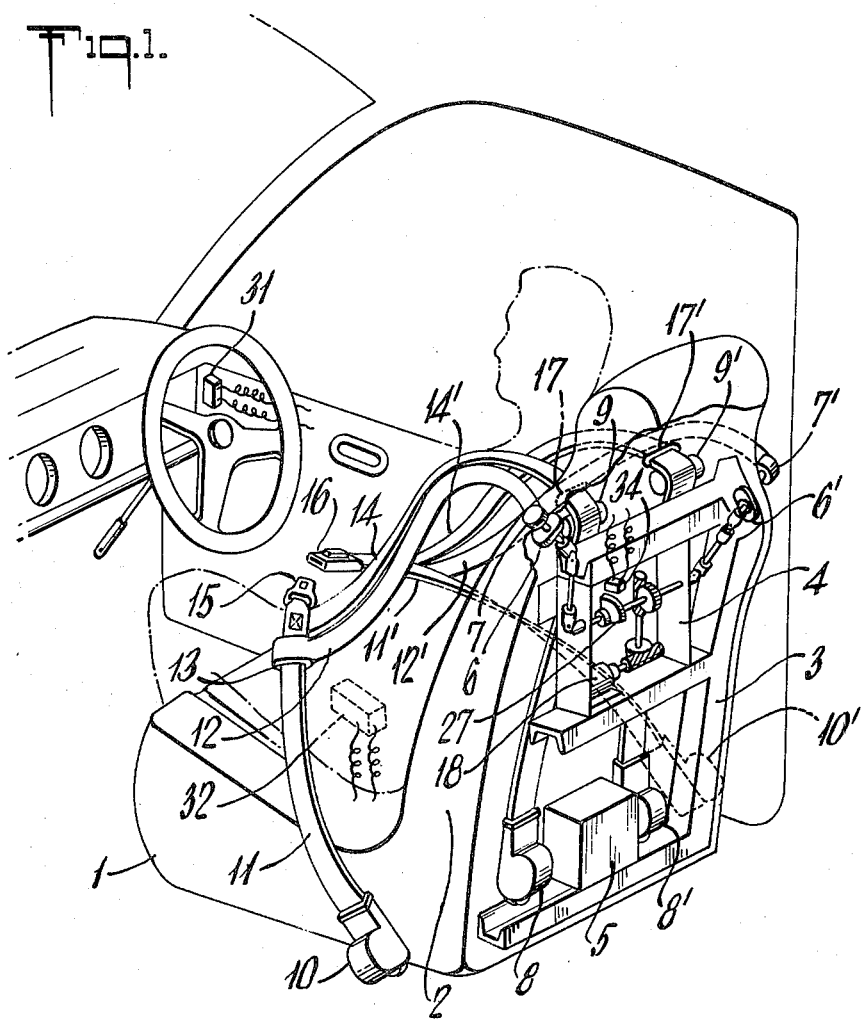
FIG. 1 is a rear perspective view, with parts broken away, of a vehicle seat occupant restraint applying system embodying the present invention.

Referring now to the drawings, particularly FIGS. 1 to 5 thereof which illustrate a preferred embodiment of the present invention, the vehicle seat with which the improved safety belt system is associated includes a seat cushion 1 and a seat back 2 mounted to and interconnected by an internal seat frame 3. Disposed and housed within the seat back 2 and attached to the seat frame 3 intermediate its top and bottom, is a gear box 4 and disposed within the lower portion thereof is a box housing the electric control means. A pair of bearing brackets 6 and 6' are respectively mounted to opposite upper inside sloping portions of the seat frame 3 for rotatably supporting corresponding inclined arm shafts 7 and 7'. Further, well known suitable shoulder belt retractor reels 8 and 8' such as of the emergency locking type for the shoulder belts and guide rolls 9 and 9' for the shoulder belts are suitably mounted to the rear seat frame 3. Moreover, well known suitable retractor reels 10 and 10', such as of the emergency locking type are suitably mounted to the seat frame 3 or to the vehicle floor and attached to the corresponding ends of the respective lap belts 11 and 11' for normal belt retraction. The other ends of lap belts 11 and 11' are passed through slots 13 and 13' formed in the lower ends of transfer arms 12 and 12' to be hereinafter described, and are provided at their end portions with a tongue 15 and buckle body 16 respectively.

Proximate the tongue 15 and the buckle body 16 and outwardly of the respective arm slits 13 and 13', the outer ends of respective shoulder belts 14 and 14' are sewn to the corresponding lap belts 11 and 11' and extend perpendicularly from the lap belts. The other ends of the shoulder belts 14 and 14' are attached to the retractor reels 8 and 8' and are wound thereon. The shoulder belts 14 and 14' extracted from the reels pass through slots 17, 17' formed in the front portion of the seat back by way of guide rolls 9, 9' and sewn at their ends to the lap belts 11 and 11'. The upper ends of arms 12 and 12' are fastened by set screws or the like to the upper ends of arm shafts 7 and 7' projecting outwardly from both upper sloping shoulder portions of the seat back and the lower ends thereof, while slideably engaging the lap belts 11 and 11' by means of the arm slots 13 and 13', are rotatable or swingable so as to advance from the lap belt reels 10 and 10' to the front of the seat occupant's abdomen.

Figure 2:
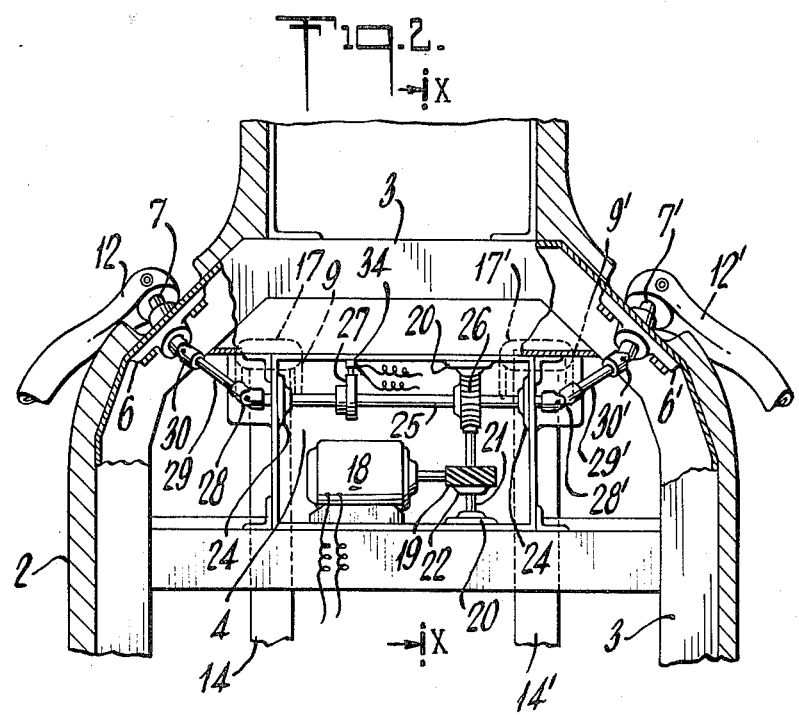
FIG. 2 is a fragmentary rear elevational view of a portion thereof showing the drive mechanism.

As shown in FIGS. 2 and 3, housed in the gear box 4 is a motor 18 which is mounted on the bottom of the box, and the motor 18 is provided with a driven worm 19. Disposed in the gear box 4 is a shaft 21 supported by upper and lower bearing block 20 fastened to the bottom and the top of the gear box 4, and a worm wheel 22 and a worm 23 are fixed to the shaft 21. Bearing blocks 24 are fastened to the upper side portions of the gear box 4, and a shaft 25 is mounted between blocks, so as to project at their end portions outside of the gear box 4. In the gear box, a wormwheel 26 and a switch cam 27 for actuating the arm of a switch 34 are fixed to the shaft 25. The worm 19 and worm wheel 22 and the worm 23 and worm wheel 26 are respectively engaged with each other. To both ends of the shaft 25 which project outside of the gear box 4, universal joints 28 and 28', intermediate shafts 29 and 29', and universal joints 30 and 30' are attached in this order, and the universal joints 30 and 30' are coupled respectively to the arm shafts 7 and 7'. The door of the vehicle is provided with a door switch 31, the seat cushion 1 with a seat switch 32, the buckle body 16 with a buckle switch (not shown in the drawings) for detecting the engagement of the buckle body 16 with the tongue 15, and the cam 27 inside of the gear box 4 with the arm of switch 34 sensing the rotational angle of the arms 12 and 12'. These switches are respectively connected with the control device 5 by means of conductors, and the control device 5 is further connected with the motor 18 by means of conductors.

The operation of the four piece type safety belt applying device will now be described. As shown by the chain line in FIG. 4, initially the lower ends of the arms 12 and 12' are situated respectively in the positions adjacent to the lap belt retractor reels 10 and 10', and the inner ends of the lap belts 11 and 11' are wound onto the belt retractor reels 10 and 10'. Therefore, the tongue 15, the buckle body 16 and the outer ends of the shoulder belts 14 and 14' are located in positions adjacent to the lap belt reels 10 and 10'. When the driver or passenger takes a seat, the seat switch 32 is closed, so that the controlling device 5 is energized. Thereafter, when the door is shut, the door switch 31 is closed, and the motor 18 is energized and rotates by actuation of the control device 5. In accordance therewith, the worm 19, worm wheel 22, shaft 21, worm 23, worm wheel 26, shaft 25, universal joints 28 and 28', intermediate shafts 29 and 29', universal joints 30 and 30', arm shafts 7 and 7' and arms 12 and 12' are successively actuated, and the transfer arms 12 and 12' thereby convey the lap belts 11 and 11' and the shoulder belts 14 and 14' forwardly and inwardly to the center of the driver's abdomen, so that the buckle body 16 and the tongue 15 are engaged with each other, as shown by the solid line in FIG. 4. In case the buckle body 16 and the tongue 15 are imperfectly engaged with each other, the motor 18 is reversed under control operation of the arm switch 34 so that the operation is repeated until the buckle 16 is engaged with the tongue 15. When the safety belt is fully properly applied by engagement of the buckle, a delay circuit provided in the controlling device 5 is actuated under the control operation of the buckle switch, and the motor 18 is thereby reversed after the lapse of a predetermined time, so that the arms 12 and 12' are returned to their former positions, as shown in FIG. 5, and the operation of the device is completed. For releasing the safety belt, the release button on the buckle body 16 is depressed to thereby uncouple the tongue from the buckle body, and the lap belts 11 and 11' and the shoulder belts 14 and 14' are returned to the positions shown by the chain lines in FIG. 4 by the spring biased retracting force of the lap belt reels 10 and 10' and the shoulder belt reels 8 and 8'.

Referring now to FIGS. 6 to 9 which illustrates an embodiment of the three point safety belt type, particular reference will be made to the points different from the first described embodiment of the four piece type. As shown in FIG. 6, the buckle body 16' is fixed directly to one side of the seat frame 3 or to the vehicle floor, and the lower end 42 of an arm 12'' slideably engages buckle body 16'. A retractor reel 10'' of known construction, such as an emergency type lock reel is fastened by bolts to the other side of seat frame 3 or to the vehicle floor. One end of a lap belt 11'' is attached to the reel 10'' so as to be wound thereon. The other end of the lap belt 11' is passed through a slot 13'' formed in the lower end of a transfer arm 12''' and is provided with a tongue 15' attached to the end portion thereof. To the portion of the belt 11'''' between the tongue 15' and the arm slot 13'', one end of a shoulder belt 14'' is sewn and extends perpendicularly to the lap belt 11''. The lap belt 11'' consists of a unit belt having a length sufficient to reach the buckle body 16' from the lap belt retractor reel 10''. The shoulder belt 14'' consists of a unit belt having, in the same manner as in the first described embodiment of the four piece type, one end thereof attached to a shoulder belt retractor 8' so as to be wound thereon, and the other end thereof, after passing through a guide roll 9' and extending forwardly from a shoulder belt guide slot 17' formed in the front of the shoulder portion of the seat back 2, sewn to the lap belt 11''. The tongue 15' includes a channel-shaped or box-shaped portion or the like, so as to be easily grasped by the lower end of a transfer arm 12''. The lower end of the transfer arm 12''' slideably retains the lap belt 11'' by the arm slot 13'' as shown in FIG. 7, and an electromagnet holder or bracket 36, as shown in FIG. 7', is fastened to the front of the lower end of the arm 12''' by bolts or the like. The electromagnet holder 36 carries a solenoid or coil 37 and a magnetic field piece or core 38 and said magnetic field piece 38 is adapted to attract the plane portion 39 of the channel-shaped or box-shaped portion of the tongue 15' and to properly direct or orient the tongue 15' so as to easily engage with the aperture 40 of the buckle body 16'. The lower end portion of the arm 12'' is provided with a box-shaped portion 41 housing a solenoid 43 and a channel-shaped bottom end 42 for grasping the tongue 15', and the bottom end 42 of the arm 12'' is situated at the rear of the buckle body 16'. A movable armature 44 of the solenoid 43 is directly coupled to a push plate 45 in the bottom portion thereof and is provided with a tension spring 46 connected to the upper portion thereof. When the solenoid 43 is open circuited the armature 44 and the push plate 45 are spring raised so that the tongue 15' is easily inserted under the push plate 45. The buckle body 16' is provided with a buckle switch 33 which is, in the same manner as in the door switch 31, seat switch 32 and arm switch 34, connected to the controlling device 5 by means of conductors, and further successively connected to the motor 18, to the arms 12'' and 12''' and so on from said controlling device 5 by means of conductors.

Considering now the operation of the last described embodiment, when the occupant takes a seat, the seat switch 32 is closed, so that the controlling device 5 is energized. Simultaneously, the coil 37 positioned at the lower end of the arm 12''' is energized so that the tongue 15' is attracted and oriented in the proper direction. Thereafter, when the door is shut, the arm 12''' is actuated, in the same manner as in the first described embodiment, as shown by the solid line in FIG. 6, so as to convey the lap belt 11'' and the shoulder belt 14'' to the center of the driver's abdomen. Simultaneously, the arm 12'' is also advanced to the center of the driver's abdomen, so that the tongue 15' is inserted into the channel-shaped bottom end 42 of the arm 12''. Thereafter, the solenoid 43 is energized by the control responding to the arm switch 34 so that the tongue 15' is grasped in the proper direction by means of the actuated armature 44 and push plate 45. By the action of the delay circuit provided in the controlling device 5, the coil 37 in the arm 12'' is deenergized after a short interval, whereby the attraction thereby is stopped. Simultaneously, the motor 18 is reversed by the actuation of the control device 5 so that the arm 12'' is returned to the position adjacent to the lap belt reel 10'', and the bottom end 42 of the arm 12'' conveys the tongue 15', the outer end of lap belt 11'' and the outer end of shoulder belt 14'' to effect the engagement of the tongue 15' with the buckle body 16', as shown in FIG. 8. In this case, when the engagement is imperfect, the motor 18 is reversed by the control responding to the arm switch 34 so that the engaging operation of the buckle is repeated. When the tongue and buckle engagement is completed, the solenoid 43 is deenergized by the control responding to the buckle switch 33, and the tension spring 46 raises the armature 44 and the push plate 45. The bottom end 42 of the arm 12'' continues to slideably move along the buckle body 16' and returns to the position where it is at the rear of the buckle body 16', as shown by the chain line in FIG. 9, and the action of the device is thus finished. For releasing the safety belt, the release element of the buckle body 16' is operated. The tongue and buckle engagement is thereby released, and the safety belts are returned to the positions shown by the chain line in FIG. 6.

In contrast with the conventional types of passive motion arresting protective devices employing semi-circumferential transfer arms and wherein excessive space is required, the device of the present invention is characterized in that the safety belt can be equipped in the space of only a semi-circular portion spread from both sides of the seat towards the front of the seat occupant, by the function of the lower end of two arms extending from both sloping sides of the shoulder portion of the seat back. Furthermore, the device of the present invention is characterized in that all of the mechanisms except the transfer arms can be easily housed inside of the seat back.

I claim:

1. A safety belt mechanism in a vehicle having a seat adapted to accommodate an occupant, a first lap belt movable from a point at a first side of said seat between an extended and a retracted position and normally urged toward a retracted position, a first coupling member mounted on said belt proximate its free end, a second coupling member adapted to releasably engage said first coupling member and connected to a point at the second side of said seat opposite to said first side and transfer means for advancing said coupling members into mutual engagement and comprising a first transfer member including a transverse upper portion extending above the shoulder level of a seat occupant and a forward portion depending from the forward part of said upper portion, means supporting the rear part of said upper portion, whereby said transfer member is swingable about a first vertically extending axis laterally offset from the medial axis of said seat between a retracted position with the lower portion of said transfer member being disposed proximate said seat first side and an advanced position forwardly and inwardly of said retracted position, first belt advancing means located on the lower part of said transfer member for extending said belt toward said second seat side with the movement of said transfer member toward said second side and means for advancing and retracting said transfer member.

2. The mechanism of claim 1 including a second transfer member similar to said first transfer member and swingable about a second vertically extending axis symmetrical with said first axis relative to said seat medial axis, said transfer members being swingable to advanced positions with their respective outer ends approaching each other and to retracted positions with said outer ends proximate said first and second sides of said seat, and second belt advancing means on said second transfer member for engaging the outer end of said belt and drawing said belt with the retraction of said second transfer member toward said seat second side and bringing said coupling members into mutual engagement.

3. The mechanism of claim 1 wherein said second coupling member is fixedly anchored proximate said seat second side.

4. The mechanism of claim 1 including a second lap belt movable from a point at said second side of said seat between an extended and retracted position and normally urged toward a retracted position, said second coupling member being mounted on the free end of said second belt, a second transfer member, said first and second transfer members being swingable about respective lateral offset first and second vertically extending axes symmetrical to said seat medial axis, means mounted on said second transfer member for extending said second belt with the advance of said second transfer member for carrying said coupling members into mutual engagement with the advance of said transfer members.

5. The mechanism of claim 1 wherein said belt has a shoulder located proximate the free end thereof and said belt advancing means comprises a body member slideably engaging said belt and a front face bearing on said shoulder with the advance of said transfer member.

6. The mechanism of claim 4 including first and second shoulder belts, each of said shoulder belts having its outer end connected to a respective first and second lap belt proximate the outer ends thereof, and spring biased retractor reels connected to the inner ends of each of said belts opposite said outer ends thereof.

7. The mechanism of claim 2 including a shoulder belt having an outer end connected to the said lap belt proximate its outer end and spring biased retractor reels connected to the inner ends of said belts.

8. The mechanism of claim 1 whereby said transfer member is shaped to correspond to the vertical contour of the torso.

9. The mechanism of claim 1 wherein said vehicle includes a door and said means for advancing and retracting said transfer means includes a drive motor comprising a first switch actuated in response to the closing of said door and a second switch actuated in response to the occupation of said seat and means responsive to the actuation of both switches for energizing said drive motor.

10. The mechanism of claim 1 wherein said first axis is outwardly upwardly inclined to the vertical.

* * * * *